United States Patent [19]

Schirf et al.

[11] 3,803,358

[45] Apr. 9, 1974

[54] VOICE SYNTHESIZER WITH DIGITALLY STORED DATA WHICH HAS A NON-LINEAR RELATIONSHIP TO THE ORIGINAL INPUT DATA

[75] Inventors: Vincent Schirf, Sudbury; Sheldon Apsell, Nahant, both of Mass.

[73] Assignee: Eikonix Corporation, Burlington, Mass.

[22] Filed: Nov. 24, 1972

[21] Appl. No.: 309,088

[52] U.S. Cl. .......................... 179/1 SA
[51] Int. Cl. .......................... G10l 1/00
[58] Field of Search ......... 179/1 SA, 1 SB, 15.55 T; 340/148, 152

[56] References Cited

UNITED STATES PATENTS

| | | | |
|---|---|---|---|
| 3,398,241 | 8/1968 | Lee | 179/1 SA |
| 3,684,829 | 8/1972 | Patterson | 179/1 SA |
| 3,104,284 | 9/1963 | French | 179/15.55 T |
| 2,262,846 | 11/1941 | Herold | 179/1 D |
| 3,209,074 | 9/1965 | French | 179/1 SA |
| 3,575,555 | 4/1971 | Schanne | 179/1 SA |
| 3,499,990 | 3/1970 | Clapper | 179/1 SA |

*Primary Examiner*—Kathleen H. Claffy
*Assistant Examiner*—Jon Bradford Leaheey
*Attorney, Agent, or Firm*—Wolf, Greenfield & Sacks

[57] ABSTRACT

An electronic speaking machine has its vocabulary stored in a solid state memory so that the device, with the possible exception of the sound generator, employs no moving parts. The machine is capable of reproducing any spoken word by storing a digital representation of that word in its vocabulary. To reduce storage space, data compression is employed to reduce the data obtained from sampling an audio signal of the spoken word. Because only fixed words are stored, the data compression technique employed can be optimized for each stored word. A particular word is selected by applying the proper "select code" to the input of the apparatus. A "start of word" signal then causes a clock to sequence a counter through the addresses in the memory where the digital data representing the word is stored. Inasmuch as the stored digital data has a non-linear relationship to the original data, the non-linear data read out of the memory is transformed by a non-linear mapper to digital data having a linear relationship to the original data. A digital to analog converter transforms the linear digital values into an audio signal that is then filtered to obtain a reconstruction of the original audio signal of the spoken word. The reconstructed audio signal can then be used as the input to a conventional amplifier and speaker system.

5 Claims, 6 Drawing Figures

VOICE SYNTHESIZER WITH DIGITALLY STORED DATA WHICH HAS A NON-LINEAR RELATIONSHIP TO THE ORIGINAL INPUT DATA

FIELD OF THE INVENTION

This invention relates in general to electronic apparatus for producing spoken words. More particularly, the invention pertains to apparatus having a vocabulary stored in digital format in a read only memory of small size. Phrases or sentences are constructed from words in the vocabulary by causing the stored words to be read out in the desired sequence in response to programmed input signals. Each word can be stored in a memory module to enable the vocabulary of the apparatus to be easily changed by substituting one word module in place of another.

BACKGROUND OF THE INVENTION

Large and complex machines have been constructed in efforts to produce a speaking machine capable of matching the ability of a human being to produce sounds. In general, such machines are based upon the ability to produce phonemes which are the essential elements of spoken words. In such machines, the phonemes are stored and are read out in a sequence to produce a word. Because of the large number of phonemes and the various ways in which they can be conjoined, machines having an extensive vocabulary have of necessity been of complex character. A need currently exists for a compact and inexpensive speaking machine having a limited vocabulary.

It has been recognized that speaking machines of limited vocabulary can be constructed by recording spoken words and causing those words to be reproduced in any desired sequence in response to appropriate commands. One known technique for generating a spoken word by machine is to sample an audio waveform of the spoken word at a sufficiently high rate, digitize each sample, and record or store the digitized values. To reconstruct the audio waveform, the stored or recorded digitized values are applied in sequence as the input signals to a digital to analog converter which thereupon emits a waveform resembling the original audio waveform. In accordance with sampling theory, sampling must be performed at a rate at least twice that of the highest frequency present in the sampled information to prevent the loss of significant data. Because of that limitation, the sampling of waveforms of spoken words yields large amounts of digital data. Consequently the storage of data for a machine having even a small vocabulary has required memories of such considerable capacity that the construction of a speaking machine of small size having a limited vocabulary has been precluded by the bulk of the memory.

THE INVENTION

The principal object of the invention is to provide a speaking machine of limited vocabulary having the words of the vocabulary stored in digital form in a memory of such limited capacity as to permit the machine to be inexpensive and of small size and yet have the machine intelligibly produce any word in its vocabulary.

The invention resides in a device having its vocabulary stored in a solid state read only memory so that the device employs no moving parts. The invention permits the storage space required in the read only memory for each word to be minimized by using data compression techniques, such as non-linear assignment of digital values to the samples of the signal or non-linear amplification of the audio signal prior to sampling. Because only fixed words are stored, this procedure has the advantage that the non-linear storage process can be optimized for each word. A particular word is selected by applying the proper "select code" to the input of the apparatus. A "start of a word" signal then causes a clock to sequence a counter through the addresses of the read only memory locations where the digital data representing the word is stored. The non-linear digital data stored at each location in the memory is read out and that information is transformed by a non-linear mapper (i.e., a digital logic circuit that performs the inverse of the data compression process) to linear digital data. An audio signal is thereby digitally constructed using a process determined by the modulation technique used in storing the digital data. A digital to analog converter then transforms the linear digital values into an analog signal that is filtered to obtain a conventional audio signal. The audio signal is then amplified to make it suitable for use as the input to a conventional audio amplifier and speaker system.

THE DRAWINGS

The invention, both as to its construction and its mode of operation, can be better understood from the detailed exposition which follows when it is considered in conjunction with the accompanying drawings in which.

Figure 1:
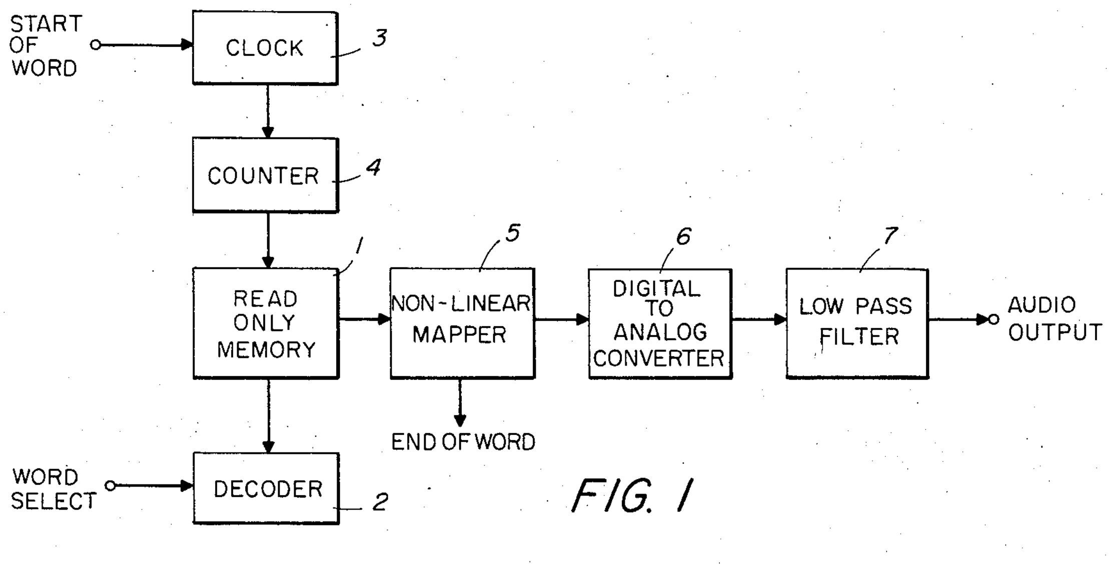
FIG. 1 is a block diagram illustrating the scheme of a rudimentary form of the invention.
Figure 5:
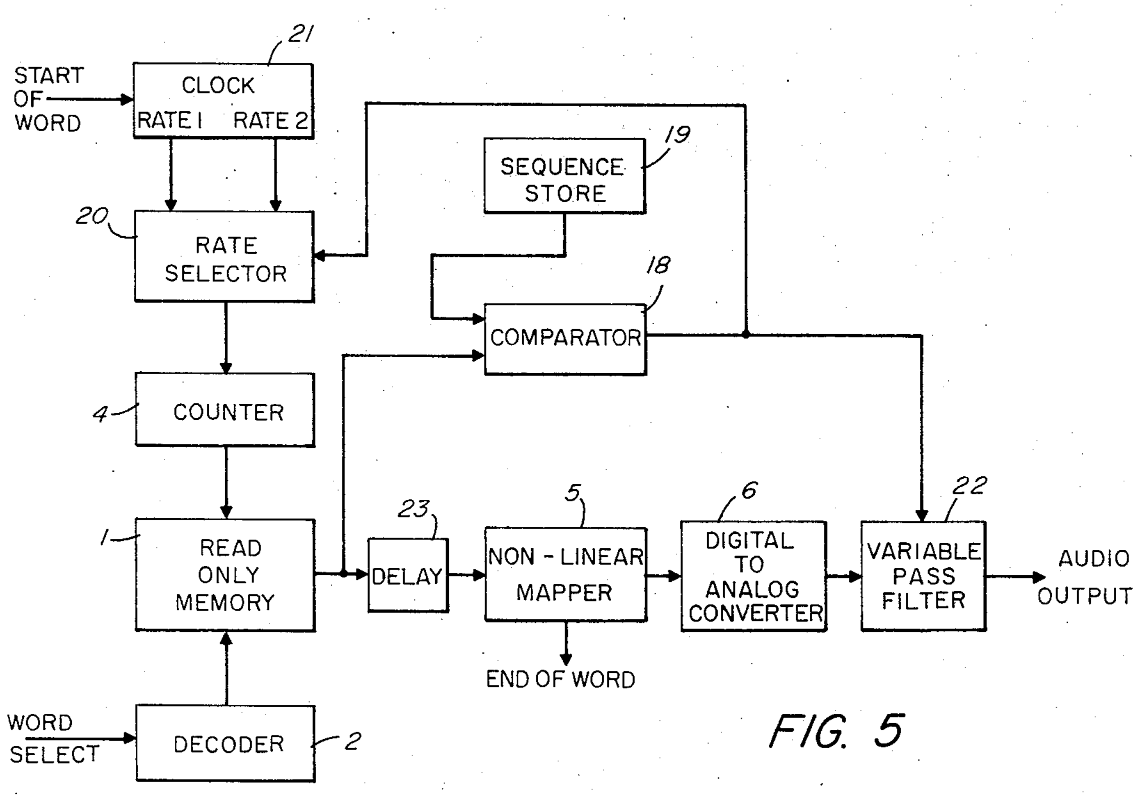
Figure 6:
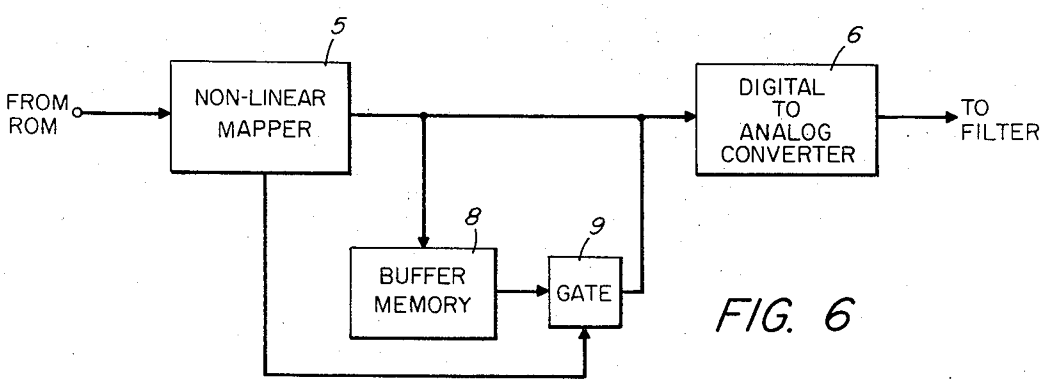

FIG. 5 schematically depicts an embodiment of the invention providing improved reproduction of the fricatives and sibilants in spoken words;

FIG. 6 depicts a modification of the FIG. 1 system employed where rectification coding has been utilized for data compression of stored vocabulary words.

THE EXPOSITION

High density storage of digital information has become feasible through the development of solid state devices capable of permanently storing many bits of binary information on a "memory" of small size. Such a device is generally referred to as a "read only memory" which is often abbreviated to ROM in the technical literature. As is known, a "bit" in binary parlance is the elemental unit of the binary system. A bit can have either one of only two binary values, viz., ONE or ZERO. If a bit is not a ONE, then it must be a ZERO as no other value is permitted in the binary system. An ROM device usually employs a semiconductor material as the memory on which binary information is permanently recorded at discrete memory sites. The binary value of the bit stored at each discrete site can be "read out" as an electrical signal by completing an electrical circuit to that site.

Figure 2:
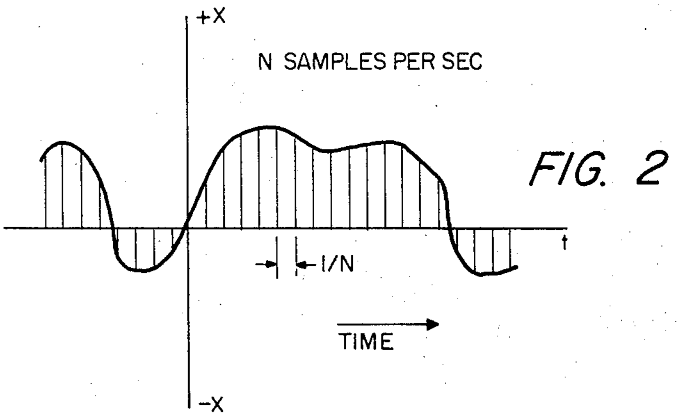
FIG. 2 is a typical audio waveform sampled at a rate N.
Figure 3:
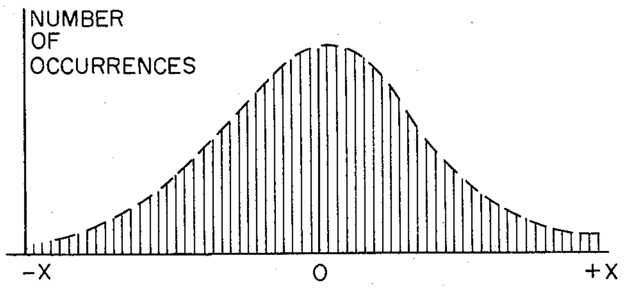
FIG. 3 is a histogram of the quantized samples obtained from a typical audio waveform.

In the scheme of the invention illustrated by the block diagram of FIG. 1, a read only memory 1 is indicated in which is recorded binary digital information representing spoken words constituting a vocabulary. The read only memory has its output fed to the input of a non-linear mapper 5 which, in turn, has its output fed to the input of an analog to digital converter 6. Inasmuch as each word of the vocabulary is stored in the memory in the form of binary digits, the size of the vocabulary of the system is essentially limited by the bit capacity of that memory. To reduce the number of bits representing a spoken word, data compression is employed. Consider, for example, FIG. 2, which depicts an audio waveform generated by a word spoken into a transducer which converts sound to an electrical signal. The amplitude $x$ of the sudio signal is a function of time t which extends along the abscissa of the graph. The waveform is sampled at a rate of N samples per second to obtain the amplitude of the waveform at the instant of each sample. Assuming, for example, a sampling rate of 5000 samples per second, the samples are quantized into 4096 levels so that any sampled amplitude can be represented by a 12 bit binary number. The quantized samples are reduced to a histogram, as depicted in FIG. 3, showing the number of occurrences of each quantized level. The 4096 possible levels are then reduced to 15 levels by a non-linear compression technique in which the histogram is first divided into 15 segments of equal area. The level for each segment is then chosen to be the amplitude at the centroid (i.e., center of gravity) of the area. This technique is known as equal area mapping. Table 1, appearing below, sets out the boundaries of the segments for a typical histogram and the output level which is the center of gravity of the segment.

TABLE 1

EQUAL AREA MAPPING

| Segment Boundaries | Output Levels | Level No. |
|---|---|---|
| −1000 to −123 | −211 | 1 |
| −123 to −70 | −93 | 2 |
| −70 to −43 | −55 | 3 |
| −43 to −26 | −34 | 4 |
| −26 to −12 | −18 | 5 |
| −12 to −2 | −7 | 6 |
| −2 to 5 | 1 | 7 |
| 5 to 9 | 6 | 8 |
| 9 to 13 | 10 | 9 |
| 13 to 20 | 15 | 10 |
| 20 to 31 | 24 | 11 |
| 31 to 47 | 37 | 12 |
| 47 to 76 | 59 | 13 |
| 76 to 149 | 106 | 14 |
| 149 to 1000 | 287 | 15 |

The 15 levels thus obtained are converted to a 4 bit binary code and the binary code for each sample is stored in its proper sequence in the read only memory. For a word spoken in one half of a second, and employing a sampling rate of 5000 samples per second, the foregoing data compression technique requires only a storage capacity of 10,000 binary bits to represent the word.

Other data compression techniques may, of course, be employed in lieu of or in addition to equal area mapping. For example, a technique which is a modification of the compression technique described by J. Max in "Quantizing For Minimum Distortion," IEEE Transaction On Information Theory, Mar. 1969, can be employed. In the modified Max technique, a mapping table is constructed as set forth below.

TABLE 2

MINIMUM MEAN SQUARE ERROR MAPPING

| Segment Boundaries | Output Levels | Level No. |
|---|---|---|
| −1000 to −270 | −327 | 1 |
| −270 to −177 | −213 | 2 |
| −177 to −118 | −141 | 3 |
| −118 to −77 | −95 | 4 |
| −77 to −47 | −59 | 5 |
| −47 to −22 | −35 | 6 |
| −22 to 0 | −9 | 7 |
| 0 to 18 | 9 | 8 |
| 18 to 42 | 27 | 9 |
| 42 to 79 | 57 | 10 |
| 79 to 134 | 101 | 11 |
| 134 to 207 | 167 | 12 |
| 207 to 320 | 247 | 13 |
| 320 to 515 | 393 | 14 |
| 515 to 1000 | 637 | 15 |

In this table, the 15 output levels form a minimum mean square error representation of the input data (i.e., the samples) in the 4096 levels. The Max technique is applied to the entire data, then reapplied to the data less that contained in the center segment, then reapplied to the data less the three center segments, etc. The boundaries and levels are given in Table 2. This is "minimum mean square error" mapping.

An improved hybrid data compression technique is obtained by combining equal area mapping with minimum mean square error mapping in accordance with the following formula:

$$L_3 = L_1 + 0.10\,(|\text{Level No.} - 8|)\,(L_2 - L_1 - 3)$$

where $L_1$ is the equal area level;

$L_2$ is the mean square error level;

$L_3$ is the new level.

The results obtained by the employment of the improved mapping technique is given in Table 3.

TABLE 3

HYBRID MAPPING

| Segment Boundaries | Output Levels | Level No. |
|---|---|---|
| −1000 to −228 | −294 | 1 |
| −228 to −136 | −166 | 2 |
| −136 to −81 | −99 | 3 |
| −81 to −47 | −59 | 4 |
| −47 to −23 | −31 | 5 |
| −23 to −6 | −13 | 6 |
| −6 to 4 | 0 | 7 |
| 4 to 9 | 6 | 8 |
| 9 to 15 | 11 | 9 |
| 15 to 31 | 22 | 10 |
| 31 to 61 | 46 | 11 |
| 61 to 109 | 87 | 12 |
| 109 to 196 | 151 | 13 |
| 196 to 366 | 276 | 14 |
| 366 to 1000 | 529 | 15 |

Inasmuch as the 4 bit binary code can accommodate 16 levels and only 15 levels are used in the foregoing data compression technique, the 16th level which is available is reserved to indicate the end of the word stored in the read only memory.

Equal area mapping, minimum mean square error mapping, and hybrid mapping are but examples of data compression techniques applicable to the automated voice response system. Other data compression techniques may be employed in lieu of or to supplement the foregoing techniques. For example, data compression can be achieved by employing techniques such as delta pulse code modulation where the information stored in the memory relates to differentials rather than to absolute values. Data compression can also be obtained by predictive schemes where N previous samples in a sequence of samples are employed to predict the current sample and the information stored in the memory is the difference between the actual sample and the predicted sample.

Additional data compression is obtainable through the use of rectification coding. Rectification coding is a novel way of attaining a storage reduction of one bit in the digitizing of a sample inasmuch as the digitized value need not indicate whether it is a positive or negative value. Rectification coding can be better understood from a consideration of Table 4 where 4(*a*) is a typical record of sampled data ranging over 29 levels from −14 to 14.

TABLE 4.—EXAMPLE OF RECTIFICATION CODING

| | | | | | | | | | | | | | | | |
|---|---|---|---|---|---|---|---|---|---|---|---|---|---|---|---|
| (a)----- | 14 | 2 | −5 | −13 | 14 | 10 | 5 | 3 | 1 | −4 | −10 | −14 | −2 | 2 | 3 |
| (b)----- | 14 | 0 | 5 | 13 | 15 | 10 | 5 | 3 | 0 | 4 | 10 | 14 | 2 | 15 | 3 |
| (c)----- | 14 | 0 | −5 | −13 | 13 | 10 | 5 | 3 | 0 | −4 | −10 | −12 | −2 | 2 | 3 |
| (d)----- | 0 | 2 | 0 | 0 | 1 | 0 | 0 | 0 | 1 | 0 | 0 | 0 | 0 | 0 | 0 |

To compress the data as indicated in line (a) only the magnitude of the data is retained so that the data then ranges over only 16 levels from 0 to 15. To allow reconstruction of the original data, the position of a sign change appearing in line (a) of Table 4 is recorded in line (b) by forcing a zero in the stored data or by recording a "flip" level (level 15 in the example). When a zero or a "flip" is read out of the memory, the sign of the succeeding samples is reversed until another zero or flip is encountered. The flip level also causes the immediately preceding sample to be reproduced with a sign change and to appear in place of the flip level. The reconstructed data is tabulated in line (c) of Table 4 and the error record appears in line (d).

In the encoding procedure for rectification coding, a computer or comparator may be employed to ascertain whether a zero or a flip produces the smallest reconstruction error and select the appropriate level. Where a computer is employed, it is programmed to force the data away from zero to avoid ambiguities in the use of the zero to designate sign change in the data.

Because the reconstruction logic requires the data to be directed to the positive or negative input of the digital to analog converter contemporaneously with the occurrence of a zero or a flip, the non-linear mapper 5 in FIG. 1 is arranged to emit a signal to digital to analog converter 6 which indicates to that converter whether the data is positive or negative. Also, a buffer memory capable of storing one sample is required to provide the proceding sample whenever a flip occurs. A suitable arrangement is depicted in FIG. 6 which shows a modification of the FIG. 1 system. In the FIG. 6 arrangement, the output of non-linear mapper 5 is applied to the input of a buffer memory 8 which stores the last sample emitted by that mapper. Upon reception of a flip level, the non-linear mapper opens gate 9 to cause the information in the buffer memory to pass to the input of digital to analog converter 6. Simultaneously, the mapper emits a signal to the converter to indicate a reversal in the sign of the information read out of the buffer memory.

The terms "map" and "mapping" as employed herein are used in their mathematical sense. For a definition of those terms see page 28 of the book Mathematical Analysis, by Tom Apostal, published by Addison-Wesley.

It should be understood that the data compression techniques here described are but illustrative of the manner in which the data obtained from the audio waveform of the spoken word can be compressed. The particular data compression method employed is not an essential aspect of this invention and as the science of data compression evolves, it can be anticipated that better and more efficient compression methods will become available. It is essential to the invention, however, that the word of the vocabulary be present in the memory in the form of digitally coded information. At present, suitable solid state memory devices are principally of the type that stores binary bits. It is not intended to limit the invention herein disclosed to systems using only binary bit memories. Where memories capable of storing information in trinary or higher bits are available such memories can be employed in the system without altering any essential aspect of the invention.

Referring again to FIG. 1, the information read out of memory 1 is fed to the input of a non-linear mapper 5. Upon completion of read out of a word from the memory 1, that memory emits binary coded signals representing the 16th level. In response to those coded signals, non-linear mapper 5 emits an output signal denominated "end of word." The end of word signal is employed, where a sequence of words is to be read out from the ROM, to insure that read out of the next word in the sequence does not commence until completion of the read out of the preceding word. Inasmuch as the vocabulary stored in the read only memory 1 includes a plurality of words, a decoder 2 is employed to enable selected words to be read out of the ROM in any desired sequence, whereby phrases or sentences can be constructed by programming the "word select" commands presented to the input of the decoder. The decoder, in response to "word select" commands, emits an output to read only memory 1, which enables that device to read out only the selected word. The encoder may, for example, employ a number of gates to enable the circuits only to the memory sites containing the digital representation of the selected word and to inhibit the circuits to all other memory sites.

To read a selected word out of the read only memory, a "start of word" signal is applied to a clock 3 which thereupon emits its output to a counter 4. The clock may be a conventional oscillator which generates a train of periodic electrical pulses. Upon the clock being enabled by the "start of word" signal, the counter commences to count the pulses emitted by the clock. The counter may be a conventional binary counter whose output changes with each clock pulse applied to its input. The counter causes the memory sites where the selected word is stored (in the form of a 4-bit code) to be read out in the sequence in which the samples are stored. As the counter advances with each clock pulse, the 4-bit codes are read out in sequence. The digitally coded signals obtained from read only memory 1 are applied to the input of non-linear mapper 5. The 4-bit coded signals emitted from memory 1 represent 15 levels. Each of those fifteen levels is related to a different one of the 15 levels which were selected from the initial 4096 amplitude levels and the relationship to the original waveform is non-linear. Therefore, non-linear mapper 5 is needed to transform the non-linear digital information obtained from the memory to coded digital signals having a linear relationship to the 15 selected levels. In essence, the non-linear mapper is a digital logic circuit that performs the inverse of the data compression process. Therefore, the non-linear mapper is, in this embodiment, digital logic circuitry which maps the four bit coded output of memory 1 into 15 levels selected from the 4096 levels of the original 12-bit-coded input word. The output of the non-linear mapper is then a digital reconstruction of the samples of the audio waveform. In the digital reconstruction, however, the amplitude of any sample can have only one of 15 different quantized values.

The output of the non-linear mapper is applied to the input of digital to analog converter 6. The digital to analog converter, in response to its input, emits a signal whose amplitude corresponds to the digital value of the coded input signals. The output of converter 6 is a waveform corresponding roughly to the shape of the audio waveform from which the digitized data was initially obtained. However, where the changing amplitude of the initial audio waveform is somewhat smoothly curved, the reconstruction emitted from the digital to analog converter is a waveform in which the transition from one amplitude level to another is a step rather than a gradual change. To obtain a reconstructed waveform more closely resembling the original audio signal, the output of the analog to digital converter is applied to the input of a low pass filter 7 to remove the higher frequencies introduced by the steps in the reconstructed waveform. The low pass filter smooths out the abrupt transitions of the stepped waveform and emits an audio signal whose waveform is in closer resemblance to the original audio signal. The audio output of filter 7 may be amplified by conventional apparatus and the amplified signals may be employed in the usual manner to drive a loudspeaker.

The automated voice response system here disclosed has an important advantage in that non-linear storage can be optimized for each word in the vocabulary. That is, the data compression technique best suited for a particular vocabulary word can be chosen for that word without being required to employ the same data compression scheme for all the other words in the vocabulary. Of course, for each different data compression technique that is employed, a different non-linear mapper must be employed.

Figure 4:
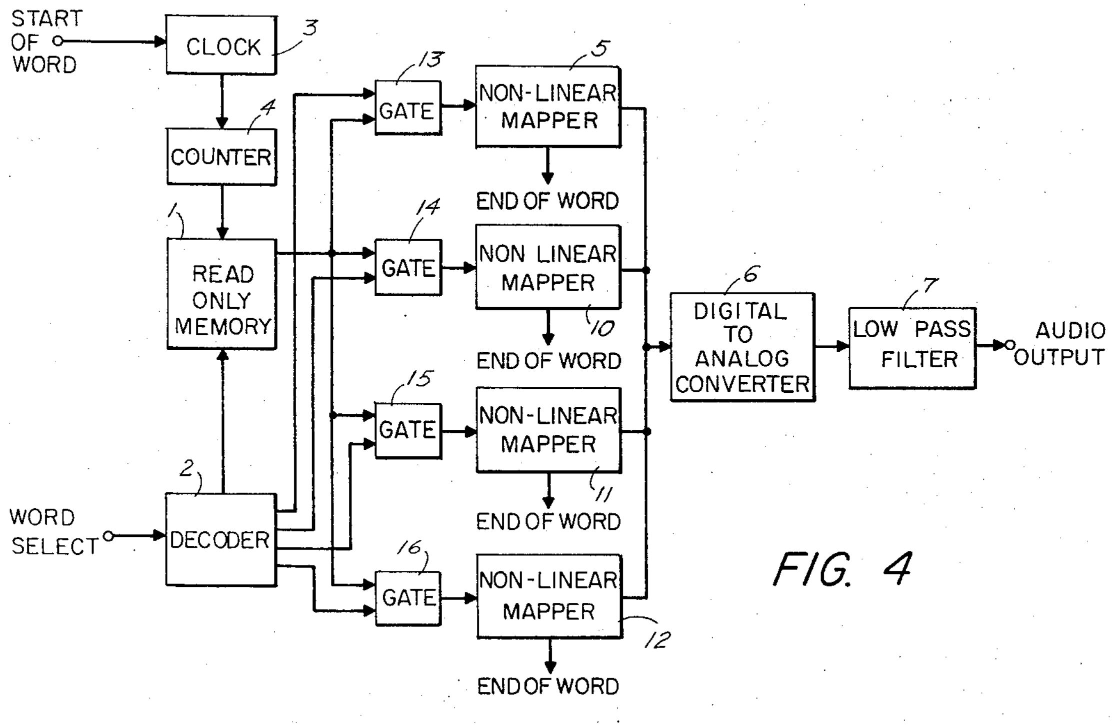
FIG. 4 is a block diagram showing the scheme of an embodiment of the invention wherein different data compression techniques were employed for various words of the vocabulary stored in the read only memory.

FIG. 4 depicts the scheme of an automated voice response system employing different data compression techniques for various words in the vocabulary. In addition to non-linear mapper 5 of the FIG. 1 embodiment, non-linear mappers 10, 11, and 12 have been added in the FIG. 4 embodiment on the assumption that four different data compression techniques are employed for words in the vocabulary. The output of read only memory 1 can be gated to the input of non-linear mappers 5, 10, 11, or 12 depending upon whether gate 13, 14, 15, or 16 is enabled. Gates 13, 14, 15, or 16 are controlled by decoder 2 in a manner such that when one of those gates is enabled, the other gates are inhibited. Thus, the output of memory 1 is applied to the input of the non-linear mapper selected by decoder 2. The decoder 2, in essence, selects the word to be read out of the memory 1 and concurrently enables one of gates 13, 14, 15, or 16 so that the output from the memory is applied to that non-linear mapper which is appropriate for the word being read out. In lieu of having decoder 2 control the gates, the information for selecting the appropriate non-linear mapper can be stored in the memory 1 so that when a particular word is commanded to be read out by the decoder, the information first emitted by the memory places the gates in the correct condition to gate the output of the memory to the appropriate non-linear mapper. The outputs of the non-linear mappers 5, 10, 11, and 12 are applied to the input of digital to analog converter 6. In all other respects the FIG. 4 embodiment is similar to the FIG. 1 embodiment. For economy, portions of the non-linear mappers which are common to all those mappers may be combined and the gates 13, 14, 15, and 16 may then be employed to add to the common part only that circuitry which is required to complete the non-linear mapper required for the particular word being read out of the memory 1.

Inasmuch as the bit storage capacity of memory 1 is an important factor in the cost entailed in storing the vocabulary of the system, it is desirable to use the minimum storage capacity for a word consistent with the necessity of reproducing the word so that it is clearly intelligible to the listener. Where the data stored in the memory is too greatly compressed, information is lost to such an extent that reproduction by the machine of the spoken word may be unintelligible or apt to be misunderstood. It has been found that sibilants in words have much of their energy at relatively high frequencies. Fricatives also tend to have a substantial part of their energy at relatively high frequencies. Before digitizing the audio waveform (FIG. 2), the audio signal is usually filtered to contain primarily frequencies below half the sampling rate. As a result, the filtering action has caused some of the sounds having their energy at relatively high frequencies to be so strongly suppressed that in some instances the sounds are no longer audible and in other instances the sound is so degraded that it is not recognizable as the original sound. An obvious solution is to increase the sampling rate to a rate sufficiently high to accommodate the higher frequencies. However, increasing the sampling rate increases the amount of storage capacity required for a word and consequently increases the cost and the size of the memory. For example, doubling the sampling rate doubles the amount of memory capacity required to store the word.

FIG. 5 depicts the scheme of an embodiment of the invention which improves the reproduction of sibilants and fricatives in the words of the vocabulary. In the employment of this embodiment, the original audio signal of the spoken word to be stored is filtered and digitized in the usual manner. The digitized information is then analyzed to find a sequence of 2 or 3 quantization levels which occurs infrequently or not at all. If a non-occurring sequence cannot be found, the infrequently occurring sequence is then selected and the data is altered so that the sequence does not occur. The portion or portions of the spoken word containing the high frequency sounds are separately recorded. The separately recorded sounds, which also include its lower frequency components, are then filtered and digitized at a suitably high sampling rate which is higher than the usual sampling rate. Wherever a high frequency sound is required to be present in the stored word, the selected sequence is placed in the memory and it is followed by the higher sampling rate digitized data. To indicate the end of the higher sampling rate data, the selected sequence is placed in the memory following that data. Thus, the data stored in the memory consists principally of data sampled at the usual rate and interspersed data sampled at a higher rate. The higher rate data is "tagged" by the special sequence which immediately precedes and follows that data.

In the FIG. 5 arrangement, the output of memory 1 is fed to a comparator 18 which receives as its other input signals, from a store 19, conforming to the selected sequence identifying the higher rate data. Upon receiving a corresponding sequence of signals from memory 1, the comparator emits a signal to rate selector 20 which causes that selector to gate into counter 4, pulses emitted by clock 21 at either a rate 1 for normally sampled data or a rate 2 for data sampled at the higher rate. The selector 20 enables clock pulses at the appropriate rate to enter counter 4. Thus data in memory 1 is read out at the higher rate where that data is preceded by the selected "tagging" sequence. Upon the recurrence of that tagging sequence, comparator 18 emits another signal to rate selector 20 which causes the counter to revert to the slower read out rate.

The output of the comparator, in addition to controlling rate selector 20, also controls a variable pass filter 22. When information is read out of memory 1 at the higher rate, comparator 18 emits a signal which increases the high end of the pass band of filter 22 inasmuch as the sounds then being read out contain relatively high frequencies. When information is read out of the memory at the normal (i.e., lower) rate, the comparator causes the upper end of the pass band of filter 22 to be reduced inasmuch as the sounds then being read out are substantially devoid of the higher frequencies. A delay unit 23 is positioned before the input to non-linear mapper 5 to permit the variable filter to be placed in the appropriate condition. The delay unit may be unnecessary where the delays occurring in non-linear mapper 5 and converter 6 are sufficient to insure that the filter will be in the appropriate condition to filter the output of converter 6.

The memory of the automated voice response system may employ modules having one or more words stored on each module. A modular memory facilitates changing or supplementing the words in the vocabulary by changing or adding modules in accordance with the changing requirements for the vocabulary.

Because the invention may be embodied in various forms, it is not intended that this patent be limited to the precise embodiments here illustrated or described. Rather, it is intended that the patent be construed to embrace those automated voice response systems which, in essence, utilize the invention defined in the appended claims.

We claim:

1. An automated voice response system comprising a memory device having a vocabulary of spoken words recorded thereon, each spoken word being recorded in the memory device as a sequence of digitally coded numbers non-linearly related to selected amplitude levels of an audio waveform derived from the spoken word, the number of selected amplitude levels being such as to provide a substantial reduction in digitized data obtained from sampling the amplitude of the audio waveform, the digitally coded numbers representing at least some of the words in the vocabulary being differently related to the selected amplitude levels of their audio waveforms whereby a different non-linear relationship exists for those words, a decoder for enabling any word in the vocabulary to be read out of the memory device in response to a word select command, means for sequentially reading out of the memory device the digitally coded numbers representing the selected word, a plurality of gates controlled by the decoder, a plurality of non-linear mappers, each non-linear mapper having its input coupled through a different one of the gates to the output of the memory device whereby when the gate is enabled the non-linear mapper receives digitally coded electrical signals from the memory device, each non-linear mapper converting received digitally coded electrical signals to coded electrical output signals whose numerical values are linearly related to the selected amplitude levels of the audio waveform of at least one of the vocabulary words, and a digital to analog converter responsive to the outputs of the non-linear mappers for converting the linearly related coded electrical signals emitted by those non-linear mappers into equivalent analog signals.

2. The automated voice response system according to claim 1, wherein the aforesaid vocabulary words having different non-linear relationships are associated with different ones of the non-linear mappers, and wherein the decoder, upon enabling a selected word to be read out of the memory device, also enables one of said plurality of gates whereby the output of the memory is fed into the non-linear mapper associated with the selected word.

3. An automated voice response system comprising a memory device having a vocabulary of spoken words recorded thereon, each spoken word being recorded in the memory device in the form of a sequence of digitally coded numbers representing non-linearly related selected amplitude levels of the audio waveform of the spoken word, the number of such selected amplitude levels providing a substantial reduction in data obtained from sampling the amplitude of the audio waveform, a decoder for enabling a word to be read out of the memory device in response to a word select command, means for sequentially reading out of the memory device the digital codes representing the selected word, said means including a rate selector for setting the rate at which read out is effected, a non-linear mapper having its input coupled to the output of the memory device and receiving therefrom digital coded electrical signals, the non-linear mapper providing a mapping output which converts the received digital coded electrical signals to coded electrical signals whose numerical values are linearly related to said selected amplitude levels of the audio waveform, a digital to analog converter having the output of the non-linear mapper coupled to its input, a filter coupled to the output of the digital to analog converter for smoothing the output of the converter, the filter being of the type having a variable pass band, and rate detector means coupled to the memory device, the rate detector means being adapted to ascertain the appropriate rate for reading information out of the memory device, the output of the rate detector controlling the rate selector and the pass band of the filter.

4. In an automated voice response system of the type employing a memory device having recorded in it a vocabulary of spoken words, each word being recorded as a sequence of encoded numbers representing the amplitude at sampled points of an audio waveform derived from the spoken word, a decoder for enabling a word to be read out of the memory device in response to a word select command, means for sequentially reading out of the memory device in the form of digital electrical signals the encoded numbers representing the selected word, a digital to analog converter for converting digitally encoded electrical input signals to output signals which are analogs of the numerical values of the encoded signals, the improvement for compressing the sample data to enable a word to be intelligibly reproduced with a substantial reduction in information recorded in the memory device, wherein in the recorded sequence of encoded numbers representing a word, the encoded numbers are non-linearly related to selected amplitude levels of the sampled audio waveform, and wherein the automated voice response system further includes a non-linear mapper having its input coupled to the output of the memory device and receiving therefrom coded electrical signals representing the selected word, the non-linear mapper having its output coupled to the digital to analog converter, and the non-linear mapper responding to the electrical signals from the memory device by emitting coded electrical signals whose numerical values are linearly related to the aforesaid selected amplitude levels of the sampled audio waveform.

5. In the automated voice response system according to claim 4, the further improvement wherein the non-linear mapper is arranged to provide different mapping outputs, and the decoder includes means for selecting the mapping output provided by the non-linear mapper.

* * * * *